(12) United States Patent
Zhang et al.

(10) Patent No.: US 8,209,422 B2
(45) Date of Patent: Jun. 26, 2012

(54) NETWORKING CAPABILITY DETERMINATION MECHANISM

(75) Inventors: Shunliang Zhang, Beijing (CN); Alexander Bachmutsky, Sunnyvale, CA (US); Achim von Brandt, München (DE); Damjan Damic, Zagreb (HR); Yi Zhang, Beijing (CN); Weihua Zhou, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 1 day.

(21) Appl. No.: 12/619,313

(22) Filed: Nov. 16, 2009

(65) Prior Publication Data

US 2010/0125631 A1 May 20, 2010

Related U.S. Application Data

(60) Provisional application No. 61/115,394, filed on Nov. 17, 2008.

(51) Int. Cl.
*G06F 15/16* (2006.01)
(52) U.S. Cl. ........................................ 709/227; 709/228
(58) Field of Classification Search .......... 709/227–228; 455/435.1, 436–444; 370/328
See application file for complete search history.

(56) References Cited

U.S. PATENT DOCUMENTS

| | | | | |
|---|---|---|---|---|
| 7,035,635 | B2 * | 4/2006 | Papoutsis et al. | 455/432.2 |
| 2004/0203956 | A1 * | 10/2004 | Tsampalis | 455/466 |
| 2005/0034115 | A1 * | 2/2005 | Carter et al. | 717/173 |
| 2005/0128956 | A1 * | 6/2005 | Hsu et al. | 370/252 |
| 2006/0025079 | A1 * | 2/2006 | Sutskover et al. | 455/67.11 |
| 2007/0021115 | A1 * | 1/2007 | Nikkelen | 455/428 |
| 2007/0026881 | A1 * | 2/2007 | Tzavidas et al. | 455/517 |
| 2007/0143637 | A1 | 6/2007 | Tsai | |
| 2007/0195764 | A1 * | 8/2007 | Liu et al. | 370/389 |
| 2007/0210894 | A1 | 9/2007 | Park et al. | |
| 2008/0002637 | A1 * | 1/2008 | Oswal et al. | 370/338 |
| 2008/0212503 | A1 * | 9/2008 | Lipford et al. | 370/310 |
| 2008/0242302 | A1 * | 10/2008 | Pulkkinen et al. | 455/436 |
| 2009/0264142 | A1 * | 10/2009 | Sankar et al. | 455/501 |
| 2011/0010764 | A1 * | 1/2011 | Lei et al. | 726/7 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.4.0 (Sep. 2008), 78 pages.
Calhoun, P., et al, "CAPWAP Protocol Specification", Network Working Group, Internet-Draft (Oct. 31, 2008), 166 pages.

(Continued)

*Primary Examiner* — Brendan Higa
(74) *Attorney, Agent, or Firm* — Brake Hughes Bellermann LLP

(57) ABSTRACT

According to one general aspect, a method may include transmitting, from a first network entity to a peer network entity, an offer to perform at least one networking function, wherein the offer includes a set of parameters indicating at least one networking capability that may be employed by the first network entity to perform the networking function. The method may include receiving, from the peer network entity, a set of parameters indicating at least one networking capability that may be employed by the peer network entity to perform the networking function. The method may include determining if at least one networking capability may be employed by both the first network entity and peer network entity to perform the networking function. The method may include selecting at least one networking capability to employ to perform the networking function. The method may include other actions as described herein.

18 Claims, 9 Drawing Sheets

OTHER PUBLICATIONS

Cudak, M., "IEEE 802.16m System Requirements", IEEE 802.16m Broadband Wireless Access Working Group, IEEE 802.16m-07/002r4 (Oct. 19, 2007), 26 pages.

"IEEE Standard for Local and metropolitan area networks; Part 16: Air Interface for Fixed Broadband Wireless Access Systems" IEEE Std. 802.16-2004 (Oct. 1, 2004), 894 pages.

"4G", Wikipedia, the free encyclopedia, Retrieved Nov. 16, 2008, 10 pages.

International Search Report and Written Opinion for International Application No. PCT/EP2009/063305, mailed on Mar. 1, 2010, 12 pages.

* cited by examiner

200

700

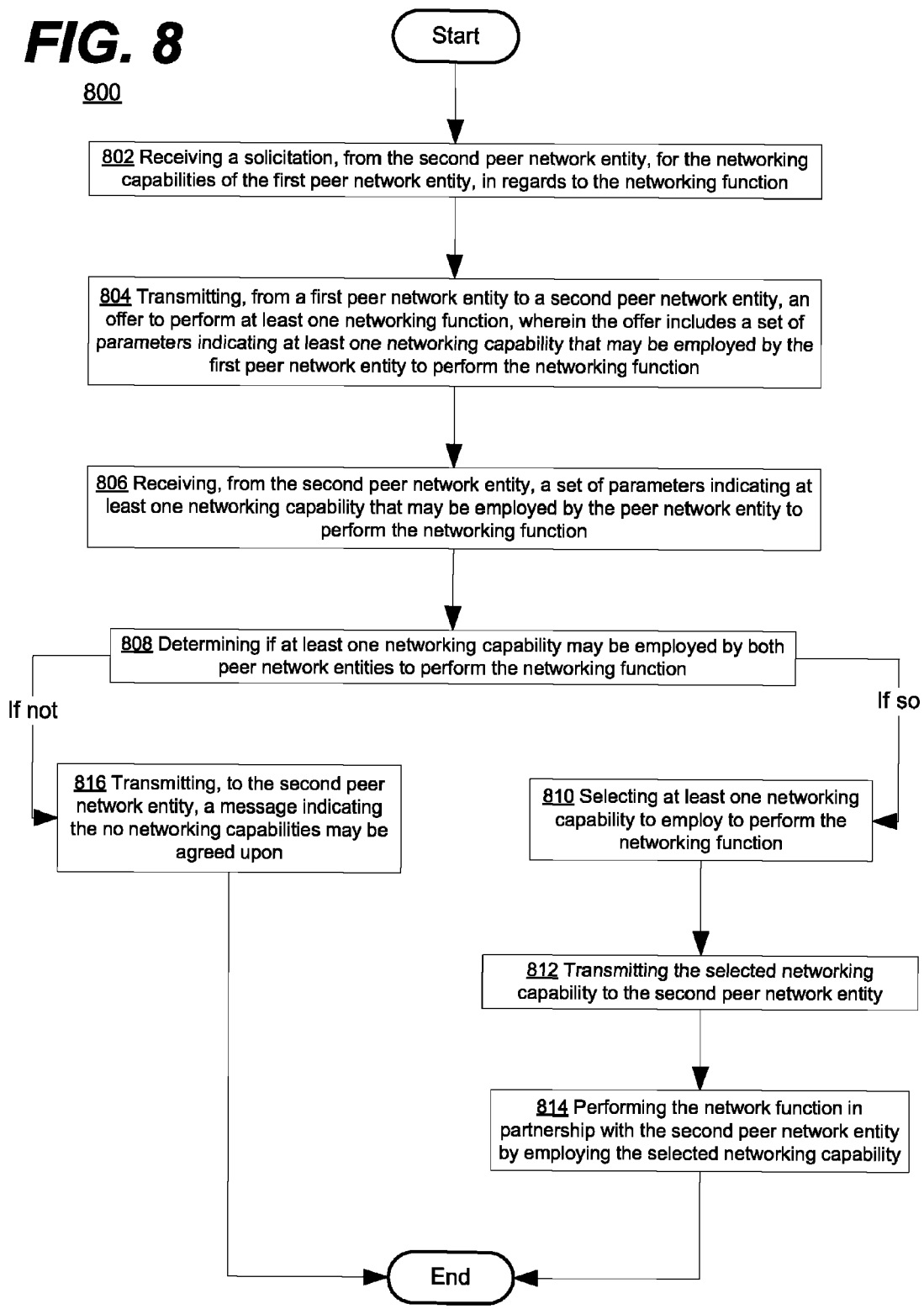

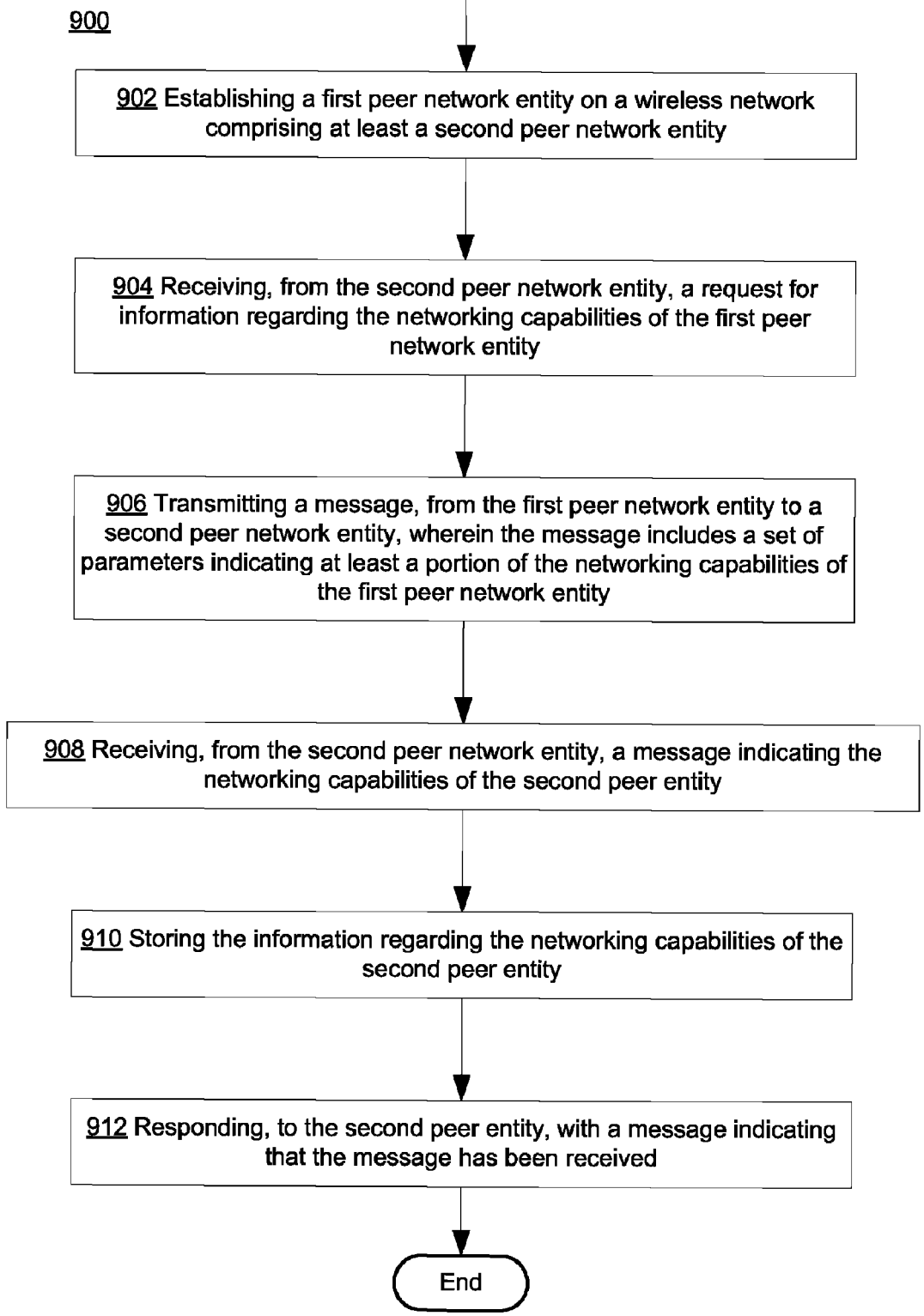

NETWORKING CAPABILITY DETERMINATION MECHANISM

CROSS-REFERENCE TO RELATED APPLICATION

This application claims priority under 35 U.S.C. §119 to U.S. Provisional Patent Application 61/115,394, filed Nov. 17, 2008, titled "Networking Capability Determination Mechanism," which is incorporated herein by reference in its entirety.

TECHNICAL FIELD

This description relates to communication, and more specifically to the communication of the networking capabilities of a network entity.

BACKGROUND

Worldwide Interoperability for Microwave Access (WiMAX) is a telecommunications technology often aimed at providing wireless data over long distances (e.g., kilometers) in a variety of ways, from point-to-point links to full mobile cellular type access. A network based upon WiMAX is occasionally also called a Wireless Metropolitan Access Network (WirelessMAN or WMAN); although, it is understood that WMANs may include protocols other than WiMAX. WiMAX often includes a network that is substantially in compliance with the IEEE 802.16 standards, their derivatives, or predecessors (hereafter, "the 802.16 standard"). Institute of Electrical and Electronics Engineers, *IEEE Standard for Local and Metropolitan Area Networks, Part 16*, IEEE Std. 802.16-2004.

One particular derivative of the 802.16 standard is the 802.16m standard that attempts to increase the data rate of wireless transmissions to 1 Gbps while maintaining backwards compatibility with older networks. IEEE 802.16 Broadband Wireless Access Working Group, *IEEE 802.16m System Requirements*, Oct. 19, 2007.

Long Term Evolution (LTE) describes the latest standardization work by 3rd Generation Partnership Project (3GPP) in the area of mobile network technology. In preparation for further increasing user demands and tougher competition from new radio access technologies, LTE is generally being enhanced with a new radio access technique called LTE-Advanced. Via this technology LTE is expected to improve end-user throughput, increase sector capacity, reduce user plane latency, and consequently offer superior user experience with full mobility.

The Evolved UMTS Terrestrial Radio Access (E-UTRA) standard typically includes the air interface of 3GPP's LTE for mobile networks. An E-UTRA network or, as it is occasionally referred to, a LTE network includes a network that is substantially in compliance with the LTE standards, their derivatives, or predecessors (hereafter, "the LTE standard" or "Release 8 standard"). 3rd Generation Partnership Project, *Technical Specification Group Radio Access Network; Evolved Universal Terrestrial Radio Access (E-UTRA); Physical Channels and Modulation (Release 8)*, 3GPP TS 36.211 V8.4.0 (2008-09), September 2008.

Fourth-Generation (4G or post-third generation (3G)), is a term used to describe the next evolution in wireless communications. A 4G system is expected to be able to provide a comprehensive internet protocol (IP) solution where voice, data and streamed multimedia can be given to users on an "Anytime, Anywhere" basis, and at higher data rates than previous generations. Various networking standards have not yet been defined as belonging to the 4G technologies, but have evolved beyond their 3G origins. In this context, such standards, the final 4G standards, and subsequent standards may be referred to as "post-3G standards".

SUMMARY

According to one general aspect, a method may include transmitting, from a base station (BS) and/or Access Service Network Gateway (ASN-GW), later referred to as a first network entity, to a peer network entity, an offer to perform at least one networking function, wherein the offer includes a set of parameters indicating at least one networking capability that may be employed by the first network entity to perform the networking function. In various embodiments, the method may include receiving, from the peer network entity, a set of parameters indicating at least one networking capability that may be employed by the peer network entity to perform the networking function. In some embodiments, the method may include determining if at least one networking capability may be employed by both the first network entity and peer network entity to perform the networking function. In one embodiment, the method may include selecting at least one networking capability to employ to perform the networking function. In various embodiments, the method may include transmitting the selected networking capability to the peer network entity. In some embodiments, the method may include performing the network function in partnership with the peer network entity by employing the selected networking capability.

According to another general aspect, an apparatus may include a processor. In various embodiments, the processor may be configured to transmit, from the apparatus to a peer network entity, an offer to perform at least one networking function, wherein the offer includes a set of parameters indicating at least one networking capability that may be employed by the apparatus to perform the networking function. In some embodiments, the processor may be configured to receive, from the peer network entity, a set of parameters indicating at least one networking capability that may be employed by the peer network entity to perform the networking function. In various embodiments, the processor may be configured to determine if at least one networking capability may be employed by both the first network entity and peer network entity to perform the networking function. In such an embodiment, the processor may be configured to, if so, select at least one networking capability to employ to perform the networking function. In various embodiments, the processor may be configured to transmit the selected networking capability to the peer network entity. In some embodiments, the processor may be configured to perform the network function in partnership with the peer network entity by employing the selected networking capability.

According to another general aspect, an apparatus may include a means for transmitting, from a first network entity to a peer network entity, an offer to perform at least one networking function, wherein the offer includes a set of parameters indicating at least one networking capability that may be employed by the BS to perform the networking function. In various embodiments, the apparatus may include a means for receiving, from the peer network entity, a set of parameters indicating at least one networking capability that may be employed by the peer network entity to perform the networking function. In some embodiments, the apparatus may include a means for determining if at least one networking capability may be employed by both the first network entity and peer network entity to perform the networking function. In one embodiment, the apparatus may include a means for selecting at least one networking capability to employ to perform the networking function. In various embodiments, the apparatus may include a means for transmitting the selected networking capability to the peer network entity. In one embodiment, the apparatus may include a means for performing the network function in partnership with the peer network entity by employing the selected networking capability.

According to another general aspect, a method may include establishing a first network entity on a wireless network comprising at least one peer network entity, wherein the wireless network utilizes a post-third generation (3G) wireless networking standard. In various embodiments, the method may include transmitting a message, from the first network entity to a peer network entity, wherein the message includes a set of parameters indicating at least a portion of the networking capabilities of the first network entity.

According to another general aspect, an apparatus may include a processor. In various embodiments, the processor may be configured to establish the apparatus on a wireless network comprising at least one peer network entity, wherein the wireless network utilizes a post-third generation (3G) wireless networking standard. In various embodiments, the processor may be configured to transmit a message, from the apparatus to a peer network entity, wherein the message includes a set of parameters indicating at least a portion of the networking capabilities of the apparatus.

According to another general aspect, an apparatus may include a means for establishing the apparatus on a wireless network comprising at least one peer network entity, wherein the wireless network utilizes a post-third generation (3G) wireless networking standard. In some embodiments, the apparatus may include a means for transmitting a message, from the apparatus to a peer network entity, wherein the message includes a set of parameters indicating at least a portion of the networking capabilities of the apparatus.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

BRIEF DESCRIPTION OF THE DRAWINGS

FIG. 8 is a flow chart of an example embodiment of a technique in accordance with the disclosed subject matter.

FIG. 9 is a flow chart of an example embodiment of a technique in accordance with the disclosed subject matter.

DETAILED DESCRIPTION

Figure 1:
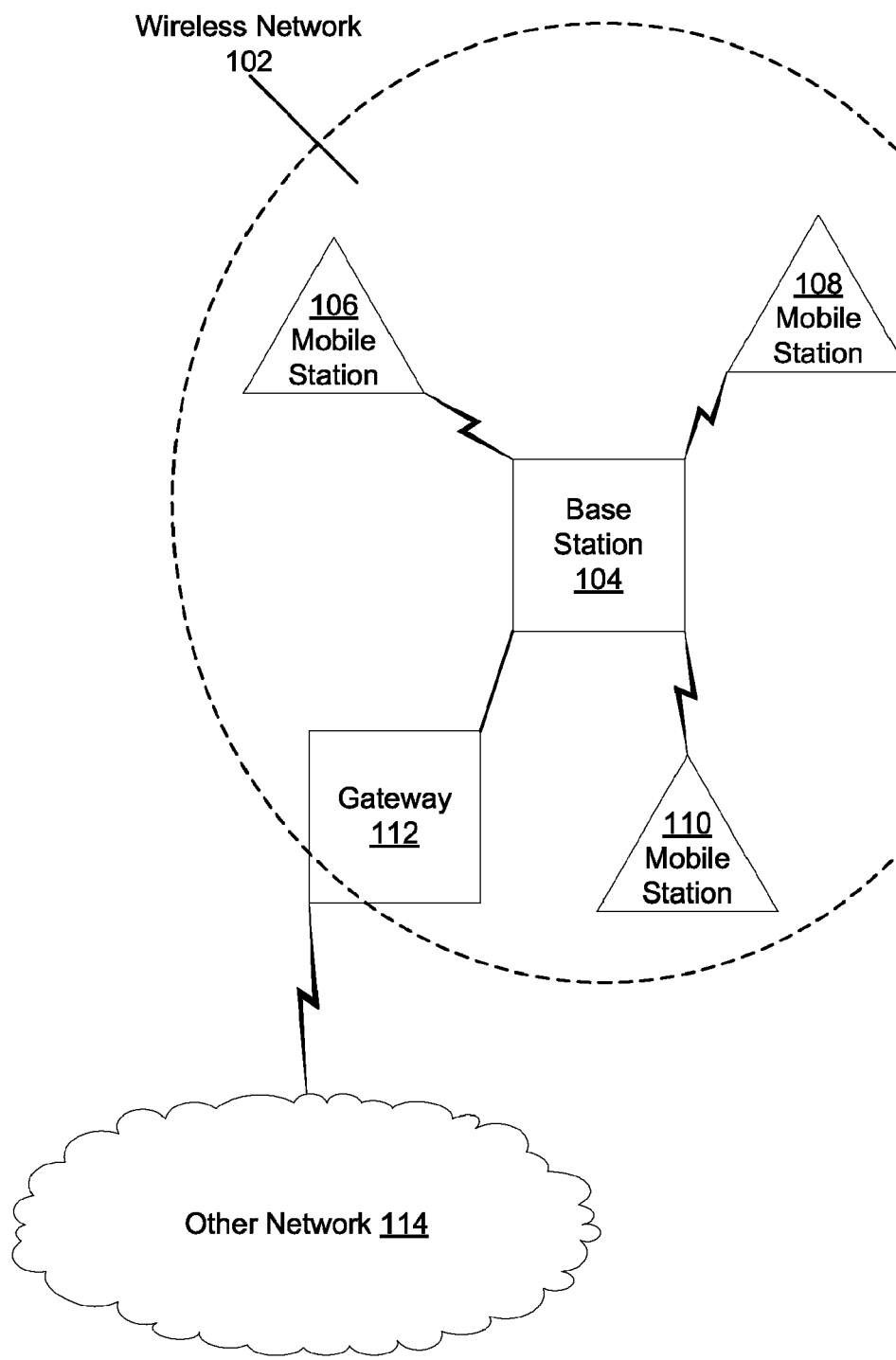
FIG. 1 is a block diagram of an example embodiment of a system in accordance with the disclosed subject matter.

Referring to the Figures in which like numerals indicate like elements, FIG. 1 is a block diagram of a wireless network 102 including a base station (BS) 104 and mobile stations (MSs) 106, 108, 110, according to an example embodiment. Each of the MSs 106, 108, 110 may be associated with BS 104, and may transmit data in an uplink (UL) direction to BS 104, and may receive data in a downlink (DL) direction from BS 104, for example. Although only one BS 104 and three mobile stations (MSs 106, 108 and 110) are shown, any number of base stations and mobile stations may be provided in network 102. Also, although not shown, mobile stations 106, 108 and 110 may be coupled to base station 104 via relay stations or relay nodes, for example. The base station 104 may be connected via wired or wireless links to another network (not shown), such as a Local Area Network (LAN), a Wide Area Network (WAN), the Internet, etc. In various embodiments, the base station 104 may be coupled or connected with the other network 114 via an access network controller (ASN) or gateway (GW) 112 that may control, monitor, or limit access to the other network.

Figure 2:
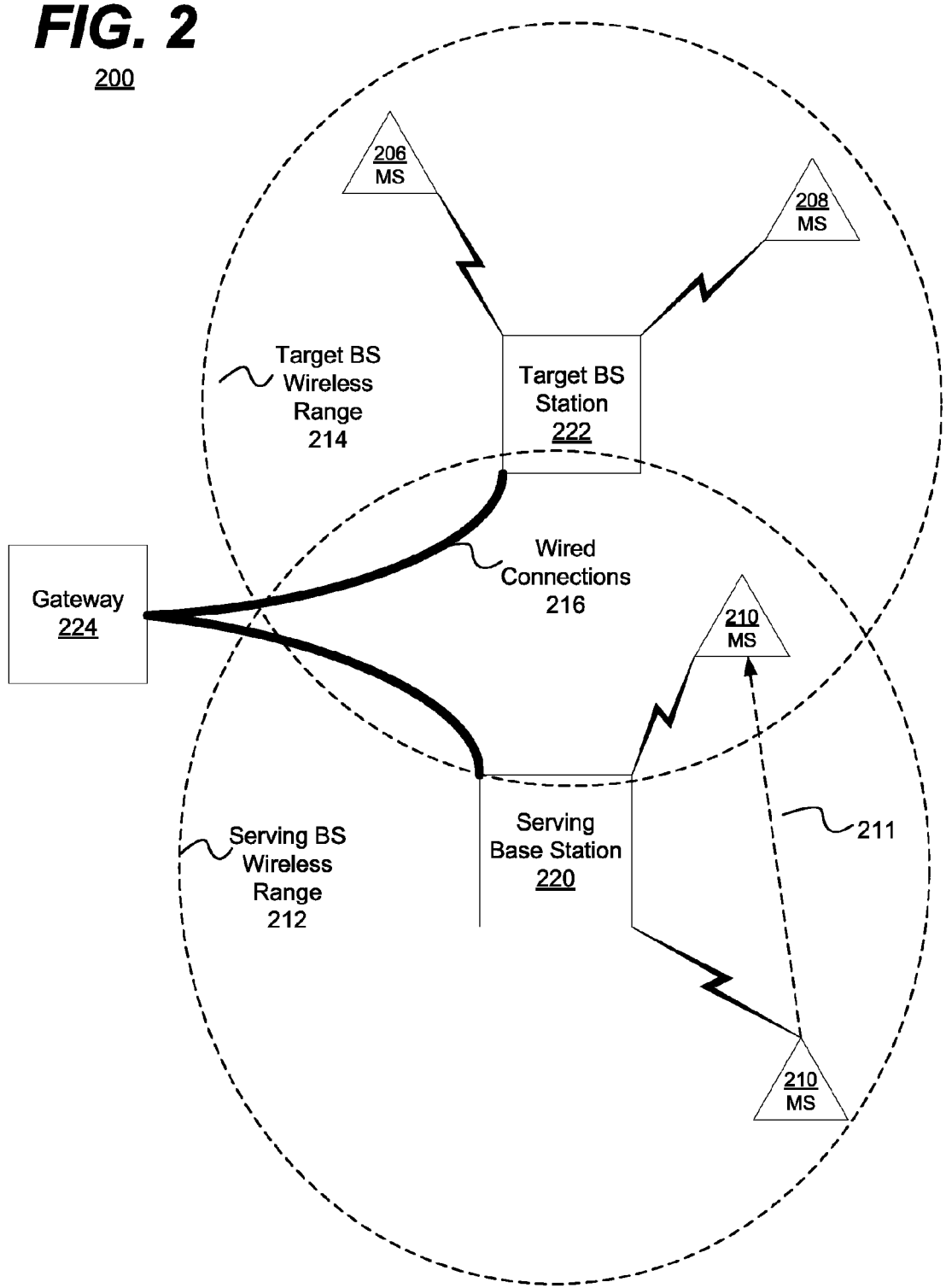
FIG. 2 is a block diagram of an example embodiment of a system in accordance with the disclosed subject matter.

FIG. 2 is a block diagram of an example embodiment of a system 200 in accordance with the disclosed subject matter. As described above, in various embodiments, the MSs may be in communication with the BS via a relay station. In one embodiment, the system 200 may include a BS 220 in direct communication with a MS 210. The system 200 may also include a second BS 222 may be in direct communication with the MSs 206 and 208. In the illustrated embodiment, the BS 220 may be referred to as a "serving BS" and the BS 222 may be referred to as a "target BS" for MS 210 willing to perform handover operation. These terms merely illustrate one possible function or designation of the BSs and are not limiting. The terms are described below in more detail.

In various embodiments, the BS 220 may have a certain wireless range 212. Likewise the BS 222 may have a wireless range 214.

In one embodiment, the BSs 220 and 222 may be capable to communicate directly. In another embodiment, both of the BSs 220 and 222 may communicate via a gateway 224. In various embodiments, the BSs 220 and 222 may each be in communication with their own respective GW (not illustrated). In the illustrated embodiment, the BSs 220 and 222 may be in communication with the GW 224 via wired connections 216, but in a general case such connection 216 may be also wireless.

In various embodiments, a MS (e.g., MS 210) may move from one BS to another. This may be due to, for example, physically moving the MS 210 and therefore, acquiring a "better" (e.g., strength, signal-to-noise ratio, features set, etc.) radio signal from a second BS. The arrow 211 illustrates this movement of the MS 210 to an area that includes the overlap of ranges 212 and 214. In such an embodiment, the MS 210 may attempt to sever the connection or association with the first or serving BS 220, and acquire or establish a connection or association with the new or target BS 222. In various embodiments, this may be referred to as a "handover".

In some embodiments, the handover procedure may include transmitting information between the BSs 220 and 222 via a relay entity (e.g., GW 224, etc.). In such an embodiment, it may be desirable to transfer information about the networking capabilities of the respect BSs 220 and 222. In one embodiment, the BS 220 may use the information to determine whether to perform the handover (e.g., MS handover may fail or be suboptimal, not due to the radio resources exchanged using Radio Resource Management (RRM) procedure, but because the BS 222 may not be able to serve at all or may not serve efficiently this MS at this point of time, etc.). Although, it is understood that the above are merely a few illustrative examples to which the disclosed subject matter is not limited.

Understanding the networking capabilities (e.g., standard version used, vendor version used, features supported, level of feature support, etc.) may be critical. For example, the WiMAX standard is not always guaranteed to be backwards compatible between versions. Therefore, an ASN-GW using version 4.3 of the WiMAX standard may not be able to effectively communicate with a BS using version 2.3 of the WiMAX standard; although, it is understood that the above is merely one illustrative example to which the disclosed subject matter is not limited. Exacerbating this problem, many networking features are merely optional and may not be supported by a network entity (e.g., a BS, a GW, etc.). Frequently, support levels and sets of supported features may differ by equipment vendors or the deploying company's procedures (e.g., an Information Technology department may not enable a given feature on their base stations, etc.). Also, the in-service software or firmware upgrade or downgrade cannot be usually performed at once for an entire network, creating different capabilities between communicating network elements.

In such an embodiment, a technique or mechanism to exchange or communicate the networking capabilities of peer networking entities (e.g., BSs, GWs, etc.) may be employed. In a more specific context involving the WiMAX standard, peer network entities may be considered to communicate with one another using the R4, R6 and/or R8 interfaces defined by the WiMAX standard.

In various embodiments, the R4 interface may include protocols originating/terminating in various entities within the Access Network (ASN) that coordinate MS mobility between ASNs. In some embodiments, the R6 interface may include protocols for communication between BSs and GWs. In various embodiments, the R8 interface may include protocols for inter-BS (e.g., BS to BS) communication. Although, only a subset of these communications may be illustrated by the shown embodiments; however, it is understood that the disclosed subject matter is not limited to merely the illustrated embodiments. Also, it is understood that while WiMAX terms are used throughout the document, the disclosed subject matter is not limited to one networking standard and that other standards (e.g., LTE, etc.) are within the scope of the disclosed subject matter.

In various embodiments, network capabilities may include support for, for example, a particular version or a set of versions of a networking standard, a maximum number of users, specific class of users (e.g., idle, active, mobile, nomadic, etc.) served by the network element or its specific function (different functions may have different scalability), a certain authentication protocol, available backhaul throughput, capability to accept new subscribers (e.g., as a preparation for the software upgrade), etc. In various embodiments, network or networking capabilities may include a list or set of features that a device may accomplish or process, and the limits of that processing ability (e.g., number of users, frequency range, etc.). Although, it is understood that the above are merely a few illustrative examples to which the disclosed subject matter is not limited.

In various embodiments, a network capability may include optional or mandatory features: such as, the service flow agent (SFA) optional capability to create pre-provisioned service flow during MS network entry; the optional Type 2 DataPath capability, the optional application of data integrity that may be applied during a handover (HO) procedure; optional capability to provide Data Path Pre-Registration during the Handover Preparation Phase, etc. In some embodiments, a network capability may include a function that is realized via different protocols. For example, Authentication, Authorization and Accounting (AAA) may be realized by Remote Authentication Dial In User Service (RADIUS) or its successor Diameter, etc.; ASN Data Path tunnel may be realized by various protocols such as Generic Routing Encapsulation (GRE), Multiprotocol Label Switching (MPLS), etc. In various embodiments, a network capability may include different versions of a protocol used to realize to function (e.g., IPv4, IPv6, etc.). In some embodiments, a network capability may include performance capability (e.g., load status, configurable load limitations, etc.). In yet another embodiment, a network capability may include a profile information and/or version information on a node level (e.g., a support standards version, a vendor version, a firmware version, etc.). Although, it is understood that the above are merely a few illustrative examples to which the disclosed subject matter is not limited.

In various embodiments, a normally network entity may or may not be capable of performing a normally mandatory feature (e.g., due to hardware or software failure, etc.). As such, it may be desirable, in one embodiment, to confirm that a network entity include the network capability expected. In another embodiment, mandatory features may function differently based upon the level of version support provided (e.g., version 1 of a mandatory feature may not include as many parameters as version 3 of the same feature, etc.). Although, it is understood that the above are merely a few illustrative examples to which the disclosed subject matter is not limited. In another embodiment, the networking capabilities supported by a device may change as a function of time. For example, once a device is rebooted or upgraded the networking capabilities may change. In another embodiment, a device may include module software or firmware, or even hardware that may fail or become impaired resulting in changing networking capabilities. Although, it is understood that the above are merely a few illustrative examples to which the disclosed subject matter is not limited.

Figure 3:
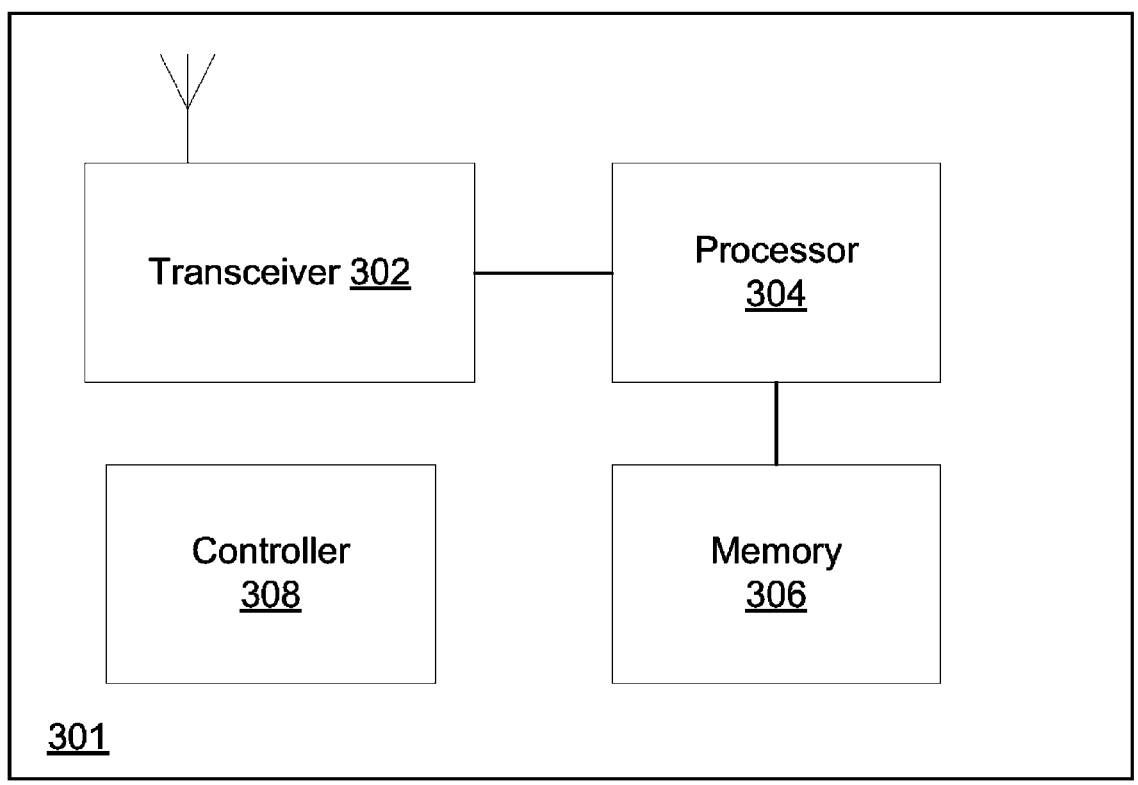
FIG. 3 is a block diagram of an example embodiment of an apparatus in accordance with the disclosed subject matter.

FIG. 3 is a block diagram of an example embodiment of a system or apparatus 301 in accordance with the disclosed subject matter. The apparatus or system 301 (e.g., base station 104, gateway 224, relay station, etc.) may include, for example, an RF (radio frequency) or transceiver 302, including a transmitter to transmit signals and a receiver to receive signals, a processor or baseband processor 304 to execute instructions or software and control transmission and receptions of signals, and a memory 306 to store data and/or instructions.

Processor 304 may also make decisions or determinations, generate frames or messages for transmission, decode received frames or messages for further processing, and other tasks or functions described herein. Processor 304, which may be a baseband processor, for example, may generate messages, packets, frames or other signals for transmission via transceiver 302. Processor 304 may control transmission of signals or messages over a network, and may receive signals or messages, etc., via a network (e.g., after being downconverted by transceiver 302, for example). Processor 304 may be programmable and capable of executing software, firmware, or other instructions stored in memory or on other computer media to perform the various tasks and functions described above, such as one or more of the tasks or methods described above. Processor 304 may be (or may include), for example, hardware, programmable logic, a programmable processor that executes software or firmware, and/or any combination of these. Using other terminology, processor 304 and transceiver 302 together may be considered as a transmitter/receiver system, for example.

In addition, a controller (or processor) 308 may execute software and instructions, and may provide overall control for the system 301, and may provide control for other systems not shown in FIG. 3, such as controlling input/output devices (e.g., display, keypad), and/or may execute software for one or more applications that may be provided on system 301, such as, for example, a network protocol encoding/decoding, a packet forwarding decision including an order or priority for packet processing, rules enforcement for packet modification/adaptation/filtering, or other application or software.

In addition, a storage medium may be provided that includes stored instructions and/or data, which when executed/processed by a controller or processor may result in the processor 304, or other controller or processor, performing one or more of the functions or tasks described above.

Figure 4:
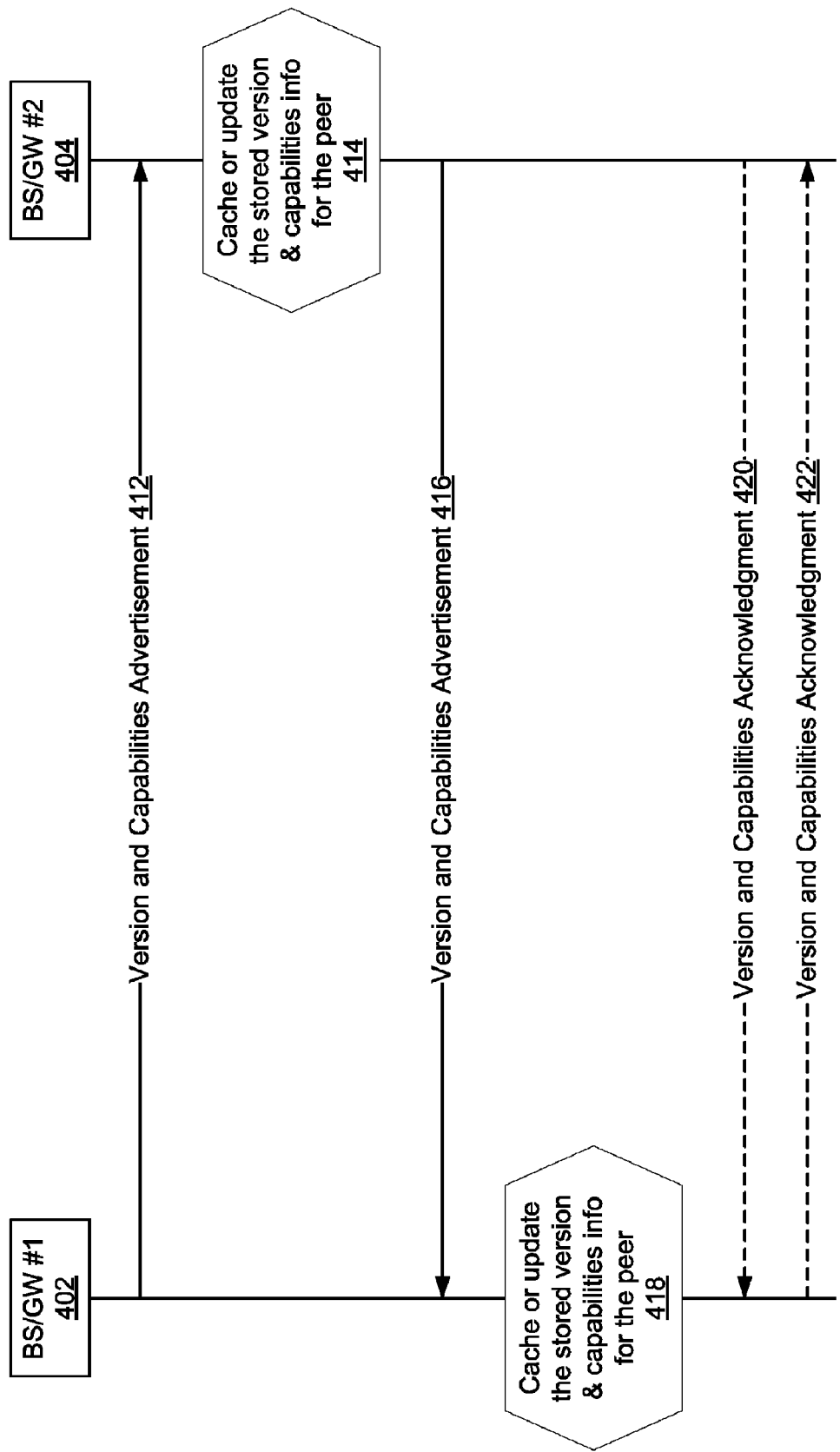
FIG. 4 is a timing diagram of an example embodiment of a system in accordance with the disclosed subject matter.

FIG. 4 is a timing diagram of an example embodiment of a system 400 in accordance with the disclosed subject matter. In various embodiments, the embodiment described may be referred to as a pushed dedicated version and capabilities message. In one embodiment, the system 400 may include a first peer network entity 402 (e.g., a BS or a GW, etc.) and a second peer network entity 404 (e.g., a BS or a GW, etc.). For illustration, the first peer network entity 402 is hereafter referred to as BS 402. Likewise, the second peer network entity 404 is hereafter referred to as BS 404. However, it is understood that these are merely two example types of peer network entities to which the disclosed matter is not limited.

In one embodiment, the BS 402 may wish to make its peer network entities, of which BS 404 is one, aware of the networking capabilities of the BS 402. In one embodiment, this may occur as part of, in response to, or after a triggering event (e.g., initialization, reboot, capabilities change due to upgrade, capabilities change due to failure, expiration of a timer or other periodic trigger, etc.).

In various embodiments, the BS 402 may transmit a version and capabilities (VnC) advertisement message 412. In some embodiments, the version and capabilities advertisement message 412 may be transmitted directly to a specific peer network entity (e.g., BS 404). In such an embodiment, the BS 402 may maintain or be configured with a list of neighboring peer network entity devices (of which BS 404 may be one), and each neighboring peer network entity device may be targeted for the version and capabilities advertisement message 412. In another embodiment, the version and capabilities advertisement message 412 may be broadcast and available to any listening peer network entity within the broadcasting range of the BS 402. In yet another embodiment, the version and capabilities advertisement message 412 may be a multicast message destined to any peer network entity that belongs to the specific multicast group.

In various embodiments, the version and capabilities advertisement message 412 may be transmitted via a wireless or wired interface. In a specific embodiment, the version and capabilities advertisement message 412 may be transmitted to the peer network entities via the R4, R6, or R8 (in the case of WiMAX) interface; although, it is understood that the above is merely one illustrative example to which the disclosed subject matter is not limited.

In various embodiments, the version and capabilities advertisement message 412 may include a set of parameters indicating at least a portion of the networking capabilities of the first peer entity BS 402. In one embodiment, the set of parameters may include a hierarchal set or sets of parameters. In various embodiments, these hierarchal set or sets of parameters may be nested.

In some embodiments, the set of parameters may be stored in a header of the version and capabilities advertisement message 412. In another embodiment, the set of parameters may be stored or included in the version and capabilities advertisement message 412 as a series of type-length-value (TLV) elements.

Figure 5:
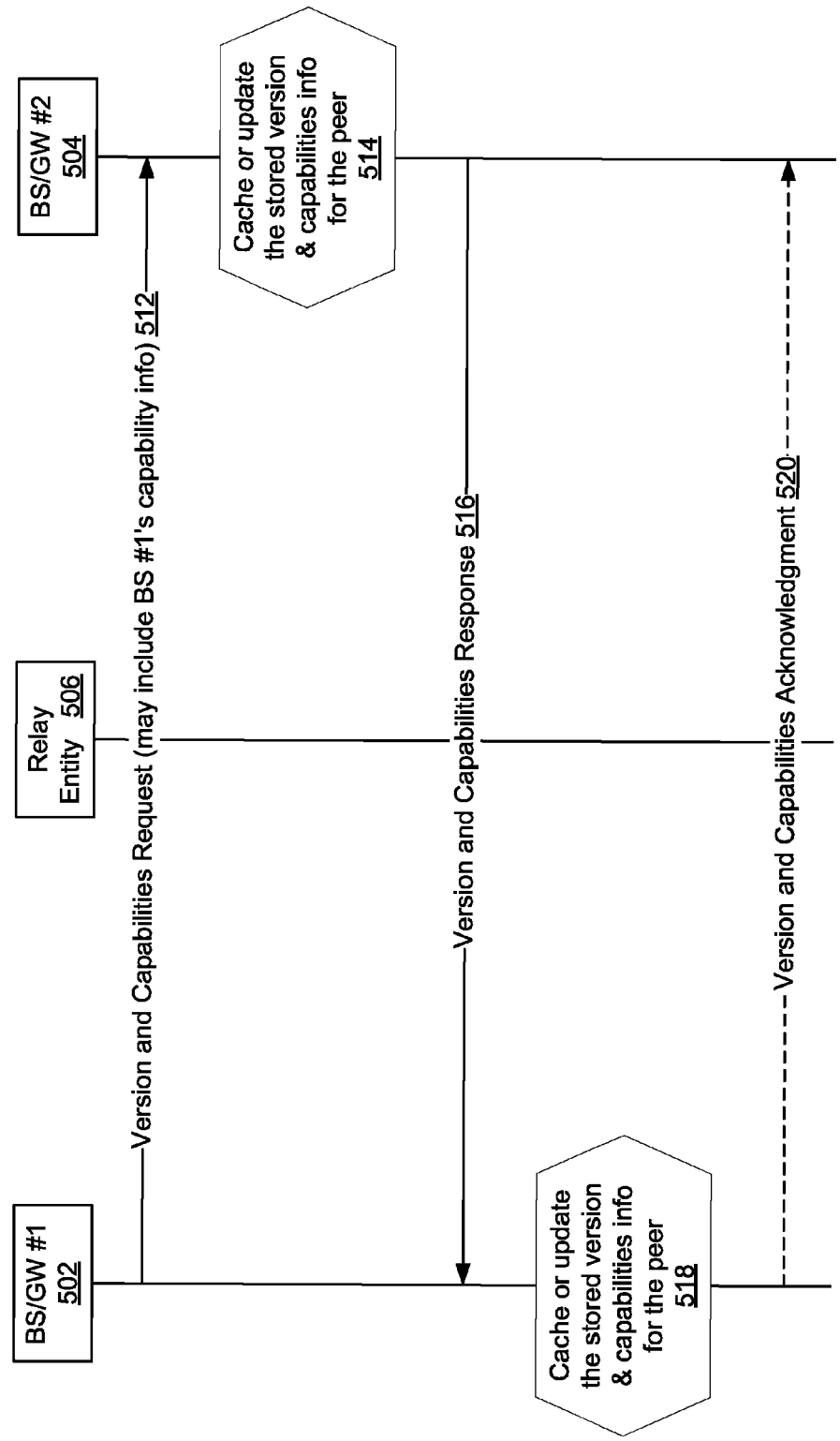
FIG. 5 is a timing diagram of an example embodiment of a system in accordance with the disclosed subject matter.

In one embodiment, the set of parameters may include a first or top hierarchal element or set that includes networking entity or node information. In such an embodiment, this set of parameters may identify to which peer network entity they pertain (for example as illustrated by FIG. 5, the set of parameters may be forwarded from device to device). In one embodiment, set of parameters may include a second or middle hierarchal element or set that includes functional information. In such an embodiment, the functional information may pertain to a type of networking capability (e.g., support for Mobile Internet Protocol version 4 (MIPv4), etc.). In one embodiment, set of parameters may include a third or bottom hierarchal element or set that includes capability information. In such an embodiment, the capability information may pertain to the specific support offered by the peer network entity (e.g., which version(s) of or how many mobile identifiers are supported, etc.). One embodiment of these set of parameters are described below in relation to FIG. 7. Although, it is understood that the above (including three levels of hierarchy) are merely a few illustrative examples to which the disclosed subject matter is not limited.

Figure 6:
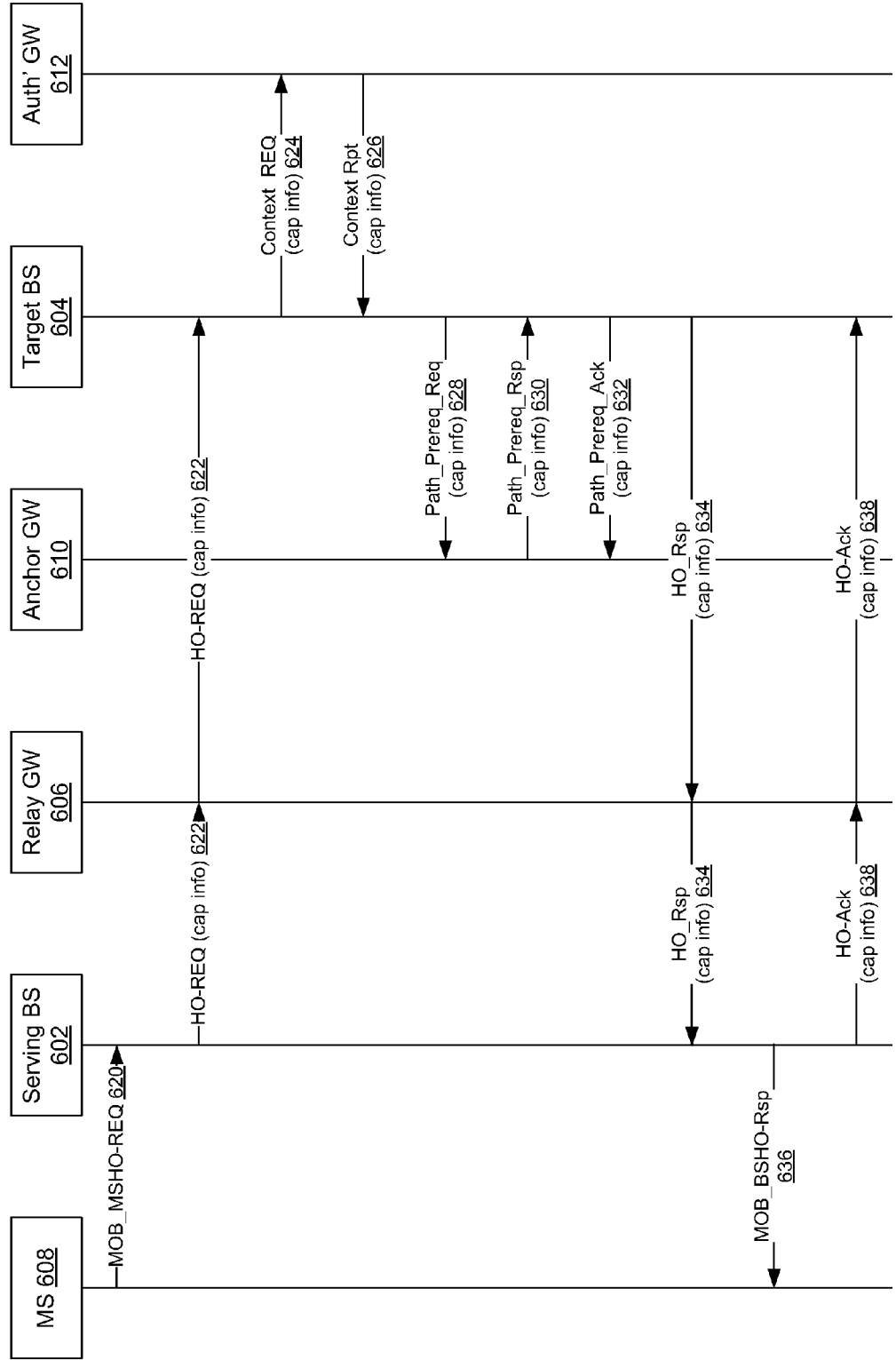
FIG. 6 is a timing diagram of an example embodiment of a system in accordance with the disclosed subject matter.

In some embodiments, the version and capabilities advertisement message 412, and all other VnC messages illustrated in FIGS. 4, 5, and 6, may include not just one set of parameters indicating at least a portion of the networking capabilities of a network entity, but two set of parameters indicating at least a portion of the networking capabilities of a network entity. In one embodiment, a first set or parameters may indicate versioning capabilities for the network entity. In one embodiment, a second set of parameters may indicate more functional networking capabilities of the network entity. In various embodiments, one or both of these sets of parameters may be included in a single message (as illustrated) or series of messages. However, in the majority illustrated embodiments, the set of parameters may include a unified version-based and function-based capabilities set of parameters. As described below in regard to FIG. 7, the set of parameters may be hierarchal and any given message (e.g., the version and capabilities advertisement message 412, etc.) may include one or more tiers or portions of that hierarchy, as is convenient, effective, or efficient.

As illustrated by block 414, in one embodiment, upon receipt of the version and capabilities (VnC) advertisement message 412 the BS 404 or second peer network entity may cache or update a version and capabilities information stored by the BS 404 and associated with BS 402. In various embodiments in which the version and capabilities advertisement message 412 only includes a portion of the BS 402's capabilities (e.g., the number of users supported has changed, etc.), the BS 404 may only update that particular portion of the stored VnC information associated with BS 402 that correlates with the version and capabilities advertisement message 412.

In various embodiments, the BS 404 may transmit its own version of the version and capabilities advertisement message 416 that includes a set of parameters indicating at least a portion of the networking capabilities of BS 404. In another embodiment, if no VnCs have been altered since the version and capabilities advertisement message 416 to BS 402, the BS 404 may advertise an empty or null set of parameters. In another embodiment, no version and capabilities advertisement message 416 may be sent.

As illustrated by block 418, in one embodiment, upon receipt of the version and capabilities advertisement message 416, the BS 402 may update its set of VnC information associated with BS 404. In various embodiments, this may be analogous to the action illustrated by Block 414.

In one embodiment, the BS 404 may transmit a version and capabilities acknowledgment message 420, in response to the version and capabilities advertisement message 412. In various embodiments, the BS 404 may transmit the version and capabilities acknowledgement message 420 in lieu of the version and capabilities advertisement message 416, as described above. In one embodiment, the BS 402 may transmit its own version and capabilities acknowledgment message 422, in response to the version and capabilities advertisement message 416.

FIG. 5 is a timing diagram of an example embodiment of a system 500 in accordance with the disclosed subject matter. In various embodiments, the embodiment described may be referred to as a pulled dedicated version and capabilities message. In one embodiment, the system 500 may include a first peer network entity (hereafter "BS") 502, a second peer network entity (hereafter "BS") 504, and a relay entity (e.g., GW) 506. It is understood that despite the specific example embodiments of the peer network entities 502 and 504 (as BSs) and the relay entity 506 (as a GW), any of the entities may include any substantially non-mobile network entity (e.g., a BS, a GW, etc.) and that these specific examples are not limiting to the disclosed subject matter.

In various embodiments, the transmissions between the two BSs 502 and 504 may be relayed by the relay entity 506. In various embodiments, the relay entity 506 may store or cache for its own purposes any information (e.g., the capabilities information) included in the relayed transmissions. It is also understood that a relay entity (e.g., relay entity 506, GW 224, etc.) may be included in the other embodiments illustrated herein (e.g., system 400 of FIG. 4, etc.).

In one embodiment, the BS 502 may transmit a version and capabilities request message 512 to the BS 504. In various embodiments, the version and capabilities request message 512 may include a request for information regarding the networking capabilities of the BS 504. In some embodiments, the version and capabilities request message 512 may include a request for a specific type of networking capability information (e.g., "Which type of authentication do you support?", etc.) instead requesting all of the networking capability of the second peer entity or BS 504.

In some embodiments, the version and capabilities request message 512 may include an indication of networking capabilities, or portion thereof, of the first peer entity or BS 502. In various embodiments, this may be similar to the version and capabilities advertisement message, as described above. In another embodiment, this inclusion may include adding a set of parameters indicating the networking capabilities, or a portion thereof, of the BS 502 in a manner similar to that described in relation to FIG. 6, as described below.

In various embodiments in which the version and capabilities request message 512 includes information regarding the networking capabilities of the BS 502, the BS 504 may cache or update a locally version of BS 502's networking capabilities, as described above. This action is illustrated by block 514.

In various embodiments, the BS 504 may respond to the version and capabilities request message 512 with a version and capabilities response message 516. In one embodiment, the version and capabilities response message 516 may include a set of parameters indicating the networking capabilities, or a portion thereof, of the BS 504, as described above. In some embodiments, if the version and capabilities request message 512 included information pertaining to BS 502, the BS 504 may respond with a preferred or selected capability based upon the information included in the version and capabilities request message 512. For example, in one embodiment, the BS 504 may attempt to match capabilities with the BS 502 and refrain from including capabilities that the BS 502 either does not support or would not understand; although, it is understood that the above is merely one illustrative example to which the disclosed subject matter is not limited.

As illustrated by block 518, upon receipt of the version and capabilities response message 516, the BS 502 may cache or update a locally version of BS 504's networking capabilities, as described above. In one embodiment, the BS 502 may respond with a version and capabilities acknowledgement message 520, as described above.

FIG. 6 is a timing diagram of an example embodiment of a system 600 in accordance with the disclosed subject matter. In various embodiments, the embodiment described may be referred to as a piggybacked version and capabilities message. In one embodiment, the system 600 may include a mobile station (MS) 608 attempting or contemplating a handover from a serving BS 602 to a target BS 604. Although, it is understood that the above is merely one illustrative example of a non-dedicated message type that may be used to transmit version and capabilities and to which the disclosed subject matter is not limited.

In one embodiment, the system 600 may include the MS 608, a serving BS 602, and a target BS 604. In other embodiments, the system 600 may also include a number of other peer network entities, such as, a relay GW 606, an anchor GW 610, and an authentication GW 612. In various embodiments, the relay GW 606 may be configured to relay messages between the BSs 602 and 604. In some embodiments, the anchor GW 610 may be configured to act as the GW connecting the MS 608 to the internet or the MS's home network (e.g., via a routing tunnel, virtual private network (VPN), etc.). In one embodiment, the authentication GW 612 may be configured to authenticate the MS 608 on the network as it associates with a BS (e.g., target BS 604).

In various embodiments, the MS 608 may initiate the handover process by transmitting a handover request message (MOB_MSHO-REQ) 620 to the serving BS 602. It is understood that, while the system 600 uses the WiMAX message naming conventions and handover process, this is merely one example embodiment to which the disclosed subject matter is not limited.

In some embodiments, in response to the MS handover request 620, the serving BS 602 may transmit a handover request message (HO-REQ or R6 HO-REQ) 622. In various embodiments, even though the handover request message 622 does not normally include version and networking capability information, the BS 602 may include a set of parameters indicating some or all of the networking capabilities of the BS 602. In various embodiments, the set of parameters may be included as a set of TLV elements, as described above.

In various embodiments, this handover request message 622 may be relayed by the relay GW 606. In one embodiment, if the relay GW 606 does not process (aside from relaying) the handover request message 622 it may not cache or store the included version and networking capability information. This relaying and caching may occur for other messages discussed below. In such a case, the relaying will not be highlighted and merely assumed to occur as described above for the subsequent relayed messages (e.g., message 634, message 638, etc.). In some embodiments, the relay GW 606 may limit some capabilities advertised by the BS 602. For example, BS 602 may advertise support for versions 4.3 and 4.4; if relay GW 606 supports only version 4.3, it may modify the capability to include only version 4.3; although, it is understood that the above is merely one illustrative example to which the disclosed subject matter is not limited.

In various embodiments, the handover request message 622 may be received by the target BS 604. In such an embodiment, the target BS 604 may store or update the version and networking capability information pertaining to the serving BS 602, as described above.

In one embodiment, the target BS 604 may transmit a context request message (R6 Context REQ) 624 to an authentication GW 612. In one embodiment, this message may primarily be focused on requesting the context information associated with the MS 608. In one embodiment, the context request message 624 may also include version and networking capability information pertaining to the target BS 604. In some embodiments, the networking capability information may be limited to capability information relating to the context transfer functions which the target BS 604 is capable of supporting.

In various embodiments, upon receiving the context request message 624, the Authentication GW 612 may be configured to check the included networking capability information to know the version and capability about context retrieve function supported by the target BS 604. In such an embodiment, the authentication GW 612 may be configured to compare the BS 604's networking capabilities verses its own or other involved network elements or functions. In one embodiment, if there is no common version and capability supported, an appropriate error or failure may be included in the Context report message 626. In various embodiments, the error message may highlight the capability mismatch. In another embodiment, Authentication GW 612 may find a set of mutually supported networking capabilities. In such an embodiment, the commonly supported or preferred version and capability info may be used in forming the context report message 626. The resulting context report message 626 may be transmitted to the target BS 604.

In various embodiments, the target BS 604 may initiate the pre-establishment of the data path for the MS 608 by transmitting a path pre-registration request (R6 Path_Prereg_Req) message 628 to the anchor GW 610. In various embodiments, the primary purpose of the path pre-registration messages 628, 630, and 632 may be to prepare the network routing for transmissions relating to MS 608 to be altered from including serving BS 602 to including target BS 604. In various embodiments, in the path pre-registration request message 628, the target BS 604 may indicate the supported version and capability info, as described above.

In various embodiments, upon receiving the path pre-registration request message 628, the Anchor GW 610 may be configured to check the version and capability on device profile (DP) function supported by the target BS 604 (with or without additional restrictions received from authentication GW 612), and compares with that of its own DP capabilities.

In various embodiments, the Anchor GW 610 may be configured to send a path pre-registration response (R6 Path_Prereg_Rsp) message 630 to the Target BS 604. In various embodiments, the path pre-registration response message 630 may include either an error or failure indication or an indication of which commonly supported or preferred version and DP networking capabilities are supported by both the Anchor GW 610 and the Target BS 604 (with or without additional restrictions received from authentication GW 612).

In one embodiment, the target BS 610 may transmit a path pre-registration acknowledgment (R6 Path_Prereg_Ack) message 632 to Anchor GW 610, in response to the receipt of the path pre-registration response message 630. In various embodiments, the path pre-registration acknowledgment (R6 Path_Prereg_Ack) message 632 may include an indication of a final determined version and capability on DP function to be used by the Anchor GW 610 and the Target BS 604.

Returning to the handover request message 622, in one embodiment, the Target BS 604 may be configured to inspect or check the hand over request message 622 to determine which version and networking capabilities, regarding the handover, that are supported by the Serving BS 602 (with or without additional restrictions applied by relay GW 606). In one embodiment, the Target BS 604 may compare those networking capabilities with its own corresponding capabilities. In various embodiments, the target BS 604 may then transmit a handover response (R6 HO_Rsp) message 634 to the Serving BS 602 (once again via the relay GW 606). As described above, the handover response message 634 may include, in one embodiment, either a failure indication (if no compatible networking capabilities exist) or a set of commonly supported or preferred networking capabilities.

In various embodiments, upon receiving the handover response message 634, the serving BS 602 may know either the supported or preferred networking capability information from the target BS 604, or a mismatch of version and networking capabilities, as indicated by error or failure parameter in the handover response message 634. In some embodiments, the serving BS 602 may store the target BS's 604 networking capability information for future use without negotiation, as described above.

In some embodiments, the serving BS 602 may be configured to reply to the MS 608 via a base station handover response (MOB_BSHO-RSP) message 636. In various embodiments, the handover response message 636 may include information regarding one or more potential Target BS's (e.g., target BS 604, if a substantially common set of handover networking capabilities was found).

In various embodiments, the Serving BS 602 may transmit a handover acknowledgement (R6 HO_Ack) message 638 to the Target BS 604, via the relay GW 606. In the message, the serving BS may indicate the final determined version and networking capabilities to the target BS 604.

While FIG. 6 illustrates a system 600 that employs a number of normally non-networking capability focused messages (i.e., messages whose primary function is not the communication of networking capability information) to transfer and negotiate networking capabilities and version protocols between two or more devices (e.g., serving BS 602 and target BS 604, target BS 604 and anchor GW 610, etc.), it is not the only such system. For example, other embodiments may use and include, instead of or in addition to a handover protocol, functions such as, network entry, service flow (SF) creation, radio resource management (RRM), quality of service (QoS), paging, idle mode (IM) operation, etc. are also possible and within the scope of the disclosed subject matter, as described above.

Figure 7:
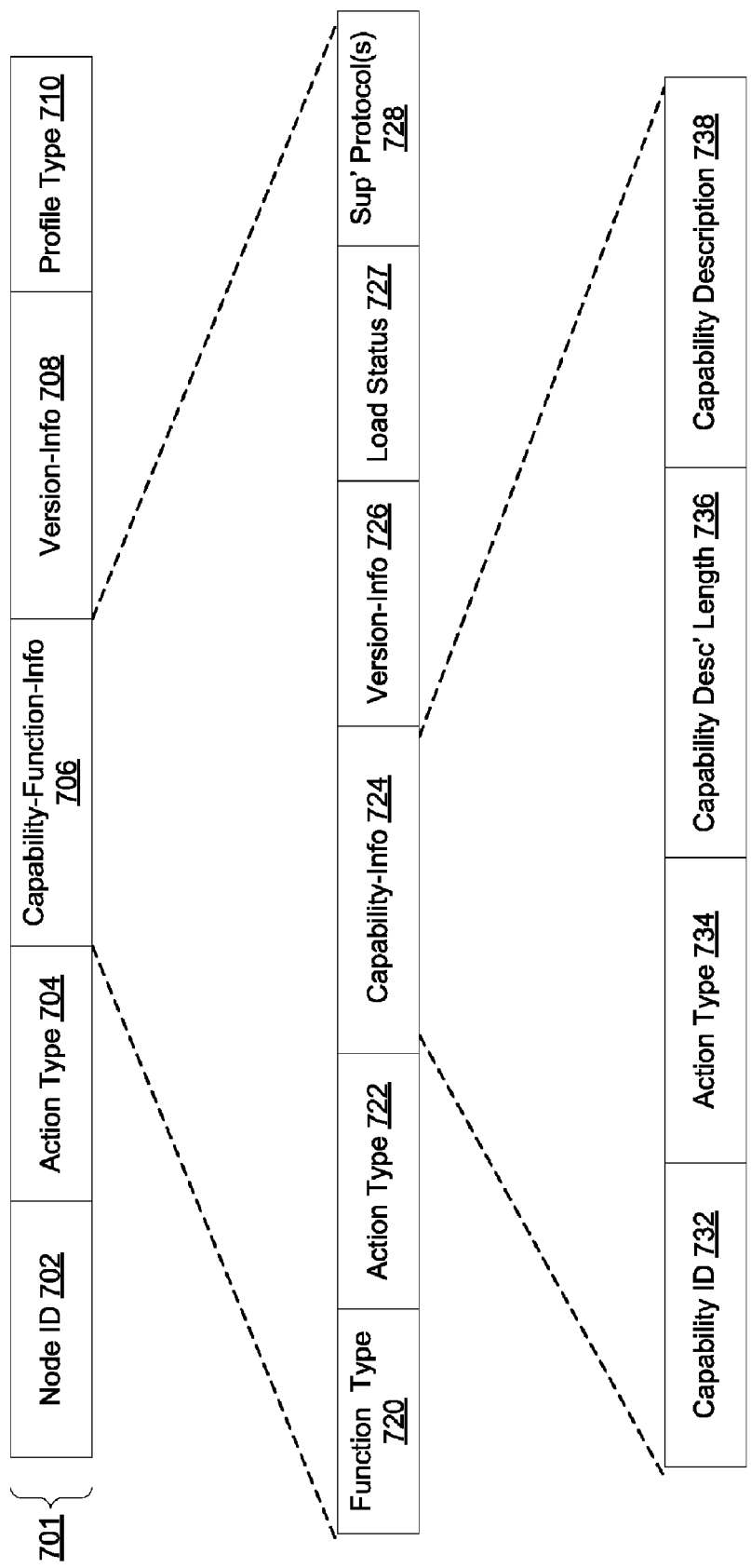
FIG. 7 is a block diagram of an example embodiment of a set of parameters in accordance with the disclosed subject matter.

FIG. 7 is a block diagram of an example embodiment of a set of parameters 700 in accordance with the disclosed subject matter. In various embodiments, information regarding the version and networking capabilities of a network entity may be transferred to a second peer network entity via a set of TLV elements or parameters, as described below. It is understood that the below is merely one illustrative example to which the disclosed subject matter is not limited, and that other forms of the set of parameters may be used (e.g., header information, field codes, etc.).

In one embodiment, the set of parameters may include one or more of the following: a Node-Information TLV or Node TLV 701, a Capability-Function Information TLV or Function TLV 706, and a Capability Information TLV or Capability TLV 724. In various embodiments, the Node-Information TLV 701 may include information indentifying to which peer network entity they pertain, as described above. In some embodiments, the Capability-Function Information TLV 706 may include information that may pertain to a type of networking capability or function (e.g., support for MIPv4, handovers, path preregistration, etc.). In one embodiment, the Capability Information TLV 724 may include information that may pertain to the specific support offered by the peer network entity (e.g., which version(s) of or how many active mobile subscribers are supported, etc.).

In various embodiments, the parameters may be nested as illustrated by FIG. 7. In another embodiment, the parameters may appear independently (e.g., the handover acknowledgment message 638 may only include the final negotiated Capability Information TLV, etc.). In yet another embodiment, the parameters may start with the Capability-Function TLV (vs. a Node-Information TLV) (e.g., if the network entity or node may be clearly identified by the message itself, such as, the context request 624, etc.). It is understood that the above are merely a few illustrative examples to which the disclosed subject matter is not limited.

Furthermore, it is understood that the sub-portions of each TLV 701, 706, and 724 may include a separate TLV or field. In such an embodiment, the Node-Information TLV 701, Capability-Function Information TLV 706, and Capability Information TLV 724 may include groups or groupings of TLVs.

In various embodiments, the Node-Information TLV 701 may include a Node Identifier (ID) field or TLV 702. In some embodiments, the Node Identifier TLV 702 may indicate the node or peer network entity to which the Node-Information TLV 701 pertains. In various embodiments, Node Identifier TLV 702 may be similar to the Source Identifier TLV as mentioned in the WiMAX standards. The Node Identifier TLV 702 may be optional and not needed if the originator is fully defined by IP header or a Source/Destination Identifier and there is no need to advertise or request general node capabilities, in one embodiment. In various embodiments, a third device (e.g., a GW, etc.) may send a Node-Information TLV 701 on behalf of another device (e.g., a BS, etc.) using the other device's node identifier. Various embodiments in which this may occur is if a BS failed and a GW took it upon itself to notify other devices of the BS's change in status; although, it is understood that the above is merely one illustrative example to which the disclosed subject matter is not limited.

In various embodiments, the Node-Information TLV 701 may include an Action Type field or TLV 704. In some embodiments, the Action Type TLV may include a set of acceptable values (e.g., NO_ACTION, MODIFY, ADD, and DELETE, etc.). In various embodiments, the NO_ACTION value may indicate that nothing has changed since the network entity last transmitted its capabilities. In such an embodiment, the Node-Information TLV 701 may not include any other fields or TLVs. In various embodiments, the MODIFY action may be used to indicate that the included capabilities have changed, since the prior capabilities report. In various embodiments, the ADD action may indicate that the following or included capabilities are to be added or used to overwrite previously stored information. In various embodiments, the DELETE value may be used to indicate that the following or included capabilities are to be deleted from a peer network entities cache. In some embodiments, a simple ADD or DELETE value without further capabilities may cause the node to be added or deleted from a peer network entity's cache (e.g., the node may not be functioning, etc.).

In various embodiments, the Node-Information TLV 701 may include zero or more Capability-Function Information TLVs 706. In some embodiments, the Node-Information TLV 701 may directly include zero or more or Capability Information TLVs 724. For example, in one embodiment, zero of these may be used, for example, in requesting all capabilities of particular node (e.g., FIG. 5, etc.). Although, it is understood that the above is merely one illustrative example to which the disclosed subject matter is not limited.

In various embodiments, the Node-Information TLV 701 may include zero or more version information fields or TLVs 708. In one embodiment, the version information TLV 708 may indicate which version(s) of the specification (e.g., v4.3, v3.7, etc.) the node supports. In various embodiments, these version numbers or values may be specified by the appropriate standards body (e.g., the WiMAX Forum, etc.). In one embodiment, the format for the version(s) may include a particular supported version, a list of supported versions, a range of versions, or a combination of the above. In various embodiments, a networking standard may define a version that may be used as a shorthand notation for one or more networking capabilities, especially in a case of mandatory capabilities required by a particular version. Although, it is understood that the above are merely a few illustrative examples to which the disclosed subject matter is not limited.

In various embodiments, the Node-Information TLV 701 may include a Profile type field or TLV 710. In one embodiment, the profile type TLV 710 may include an indication of the profile type employed the network entity or node. In various embodiments, a networking standard may define a profile that may be used as a shorthand notation for one or more networking capabilities.

In various embodiments, the Capability-Function Information TLV 706 may include a Function Type field or TLV 720. In various embodiments, the Function Type TLV 720 may include an indication of the networking function (e.g., mobility, data path management, security, etc.) that the Function Type TLV 720 pertains to. In one such embodiment, the Function Type TLV 720 may employ the same values as Function Type in WiMAX header. In some embodiments, the Function Type TLV 720 may be used to request/advertise capabilities for specific function, as described above.

In various embodiments, the Capability-Function Information TLV 706 may include an Action Type field or TLV 722. In various embodiments, this Action Type TLV 722 may function analogously to the Action Type TLV 704 described above, but in relation to the Capability-Function instead of the node.

In various embodiments, the Capability-Function Information TLV 706 may include zero or more nested Capability-Info TLVs 724. In various embodiments, if zero Capability-Info TLVs 724 are included it may indicate a request for all networking capabilities associated with the particular function.

In various embodiments, the Capability-Function Information TLV 706 may include zero or more Version-Information fields or TLV 726. In various embodiments, this Version-Information TLV 726 may function analogously to the Version-Information TLV 706 described above, but in relation to the Capability-Function instead of the node.

In various embodiments, the Capability-Function Information TLV 706 may include a Load Status field or TLV 727. In various embodiments, the Load Status TLV 727 may include an indication of the load status of one network element in regards to the function (e.g., under loaded, normal loaded, overloaded, 100 users, etc.). In various embodiments, the Load Status TLV 727 may not be present if, for example, it is not applicable to the function.

In various embodiments, the Capability-Function Information TLV 706 may include zero or more Supported Protocols field or TLV 728. In various embodiments, the Supported Protocols TLV 728 may include an indication of the supported protocols to realize the function. In various embodiments, this may done similarly to the Version Information TLV 726, as described above.

In various embodiments, the Capability Information TLV 726 may include a Capability ID field or TLV 732. In various embodiments, the Capability ID TLV 732 may include an identification of the specific networking capability described by the Capability-Information TLV 726. In a specific embodiment, a particular standard may include a range of Capability IDs that are reserved for future purposes, a range of IDs that may be used in proprietary manner for vendor-specific capabilities, and a range of IDs and particular values of these IDs that are standardized to indicate specific capabilities.

In various embodiments, the Capability Information TLV 726 may include an Action Type field or TLV 734. In various embodiments, this Action Type TLV 734 may function analogously to the Action Type TLV 704 described above, but in relation to the Capability instead of the node.

In various embodiments, the Capability Information TLV 726 may include a Capability Description Length field or TLV 736. In various embodiments, the Capability Description Length TLV 736 may include an indication of the length of Capability Description field or TLV 738. In various embodiments, the Capability Description Length TLV 736 may indicate the number of Capability Description TLVs 738 included in the Capability Information TLV 726. In some embodiments, a value of zero (0) may indicate that no Capability Description TLV 738 is included in the Capability Information TLV 726.

In various embodiments, the Capability Information TLV 726 may include zero or more Capability Description TLVs 738. In one embodiment, the number of Capability Description TLVs 738 may be zero or one. In various embodiments, the Capability Description TLV 738 may include a description for the capability pertaining to the Capability Information TLV 726. Often, in one embodiment, the contents and size of the Capability Description TLV 738 may vary based upon capabilities. For example, for some capabilities the TLV 738 may be null or not exist, for example, because the capability is fully defined by its ID. In another embodiment, for some capabilities the TLV 738 may include, for example, a value, multiple values, range(s) of values, version information, scalability information, performance information, etc.

FIG. 8 is a flow chart of an example embodiment of a technique 800 in accordance with the disclosed subject matter. In various embodiments, the technique 800 may be performed by the system of FIG. 1 or 2, the apparatus of FIG. 3, as described above. In some embodiments, the technique 800 may be used to perform some or all of the actions illustrated by FIGS. 4, 5 and/or 6, as described above. In some embodiments, the technique 800 may be used with parameters as illustrated by FIG. 7, as described above.

Block 802 illustrates that, in one embodiment, a solicitation may be received, from the second peer network entity (e.g., a GW, BS, etc.), for the networking capabilities of the first peer network entity (e.g., a BS, GW, etc.), in regards to the networking function, as described above. In various embodiments, the solicitation may include a dedicated message, as described above. In another embodiment, the solicitation may include a message whose primary function is not the transmission of networking capability information (e.g., a handover message, etc.), as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 and/or transceiver 302 of FIG. 3, as described above.

Block 804 illustrates that, in one embodiment, a first peer network entity may transmit, to a second peer network entity, an offer to perform at least one networking function, wherein the offer includes a set of parameters indicating at least one networking capability that may be employed by the first peer network entity to perform the networking function, as described above. In various embodiments, transmitting may include transmitting a message whose primary function is the initiation of the performance of networking function (e.g., a handover message, etc.), as described above. In some embodiments, transmitting may include transmitting the offer in response to the received solicitation, as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 and/or transceiver 302 of FIG. 3, as described above.

Block 806 illustrates that, in one embodiment, the receipt, from the second peer network entity, a set of parameters indicating at least one networking capability that may be employed by the peer network entity to perform the networking function, as described above. In various embodiments, receiving may include receiving a solicitation, from the peer network entity, for the networking capabilities, in regards to the networking function, of the first peer network entity, as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 and/or transceiver 302 of FIG. 3, as described above.

Block 808 illustrates that, in one embodiment, a determining may be made as to whether or not at least one networking capability may be employed by both peer network entities to perform the networking function, as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 of FIG. 3, as described above.

Block 810 illustrates that, in one embodiment, the first peer network entity may select at least one networking capability to employ to perform the networking function, as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 of FIG. 3, as described above.

Block 812 illustrates that, in one embodiment, the first peer network entity may transmit the selected networking capability to the second peer network entity, as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 and/or transceiver 302 of FIG. 3, as described above.

Block 814 illustrates that, in one embodiment, the first peer network entity may perform the network function in partnership with the second peer network entity by employing the selected networking capability, as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 and/or transceiver 302 of FIG. 3, as described above.

Block 816 illustrates that, in one embodiment, if no networking capability can be agreed upon by both peer network entities, the first peer network entity may transmit, to the second peer network entity, a message indicating the no networking capabilities may be agreed upon, as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 and/or transceiver 302 of FIG. 3, as described above.

In various embodiments, a networking capability may include a capability selected from a group consisting of a protocol, a processing capacity, and a protocol version, as described above. In one embodiment, at least one of the set of parameters may include a nested set of parameters arranged in a hierarchal fashion, as described above. In some embodiments, the nested set of parameters arranged in a hierarchal fashion may include a first hierarchal level including networking entity information, a second hierarchal level including functional information, and a third hierarchal level including capability information, as described above.

FIG. 9 is a flow chart of an example embodiment of a technique 900 in accordance with the disclosed subject matter. In various embodiments, the technique 900 may be performed by the system of FIG. 1 or 2, the apparatus of FIG. 3, as described above. In some embodiments, the technique 900 may be used to perform some or all of the actions illustrated by FIGS. 4, 5 and/or 6, as described above. In some embodiments, the technique 900 may be used with parameters as illustrated by FIG. 7, as described above.

Block 902 illustrates that, in one embodiment, a first peer network entity (e.g., a BS, a GW, etc.) may be established on a wireless network comprising at least a second peer network entity (e.g., a GW, a BS, etc.), as described above. It is understood that, in one embodiment, establishing may include only the actions performed by the first peer network entity. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 and/or transceiver 302 of FIG. 3, as described above.

Block 904 illustrates that, in one embodiment, the first peer network entity may receive, from the second peer network entity, a request for information regarding the networking capabilities of the first peer network entity, as described above. In various embodiments, receiving may include receiving, from the peer network entity, a message indicating the networking capabilities of a peer entity, as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 and/or transceiver 302 of FIG. 3, as described above.

Block 906 illustrates that, in one embodiment, the first peer network entity may transmit a message, from the first peer network entity to a second peer network entity, wherein the message includes a set of parameters indicating at least a portion of the networking capabilities of the first peer network entity, as described above. In various embodiments, transmitting may include transmitting, after the occurrence of a triggering event, an unsolicited message including a set of parameters indicating the networking capabilities of the first peer network entity, as described above. In one embodiment, transmitting may include transmitting the message in response to a received request, as described above. In some embodiments, transmitting may include integrating a set of parameters indicating the networking capabilities of the first peer network entity into a non-capabilities message (e.g., a handover message, etc.), and transmitting the non-capabilities message, as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 and/or transceiver 302 of FIG. 3, as described above.

Block 908 illustrates that, in one embodiment, the first peer network entity may receive, from the second peer network entity, a message indicating the networking capabilities of the second peer entity, as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 and/or transceiver 302 of FIG. 3, as described above.

Block 910 illustrates that, in one embodiment, the first peer network entity may store the information regarding the networking capabilities of the second peer entity, as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 and/or memory 306 of FIG. 3, as described above.

Block 912 illustrates that, in one embodiment, the first peer network entity may respond, to the second peer entity, with a message indicating that the message has been received, as described above. In various embodiments, the action(s) illustrated by this block may be performed by various elements, such as the BS 104 or GW 112 of FIG. 1, the BSs 220, 222, or GW 224 of FIG. 2, the apparatus 301, and/or the processor 304 and/or transceiver 302 of FIG. 3, as described above.

In various embodiments, a networking capability may include a capability selected from a group consisting of a protocol, a processing capacity, and a protocol version, as described above. In one embodiment, at least one of the set of parameters may include a nested set of parameters arranged in a hierarchal fashion, as described above. In some embodiments, the nested set of parameters arranged in a hierarchal fashion may include a first hierarchal level including networking entity information, a second hierarchal level including functional information, and a third hierarchal level including capability information, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, including but not limited to Digital Signal Processors (DSP), Network Processors (NP), etc. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
    transmitting, from a first network entity to a peer network entity, an offer to perform at least one networking function, wherein the offer includes a set of parameters indicating at least one version and at least one networking capability that may be employed by the first network entity to perform the networking function;
    receiving, from the peer network entity, a set of parameters indicating at least one version and at least one networking capability that may be employed by the peer network entity to perform the networking function;
    determining if at least one version and at least one networking capability may be employed by both the first network entity and peer network entity to perform the networking function; and
    if so, selecting at least one version and at least one networking capability to employ to perform the networking function, transmitting the selected networking capability to the peer network entity, and performing the network function in partnership with the peer network entity by employing the selected networking capability; and
    wherein the set of parameters includes: a group of parameters for each capability, wherein the group of parameters includes: a capability identifier, an action type, capability description length, and a capability description.

2. The method of claim 1 wherein transmitting includes: selecting at least one networking capability from a plurality of networking capabilities based, at least in part, upon a network subscriber.

3. The method of claim 1 wherein transmitting an offer includes: transmitting a message whose primary function is the initiation of the performance of networking function.

4. The method of claim 1 further including: receiving a solicitation, from the peer network entity, for the at least one networking capability of the first network entity, in regards to the networking function; and wherein transmitting an offer includes:
    transmitting the offer in response to the received solicitation.

5. The method of claim 1 wherein receiving a set of parameters from the peer network entity includes: receiving a solicitation, from the peer network entity, for the at least one networking capability, in regards to the networking function, of the first network entity.

6. The method of claim 1 wherein at least one of the set of parameters includes: a nested set of parameters arranged in a hierarchical fashion.

7. The method of claim 6 wherein the nested set of parameters arranged in a hierarchal fashion includes: a first hierarchal level including networking entity information, a second hierarchal level including functional information, and a third hierarchal level including capability information.

8. The method of claim 6 wherein the nested set of parameters arranged in a hierarchal fashion includes: a first hierarchal level including functional information, and a second hierarchal level including capability information.

9. The method of claim 6 wherein the set of parameters includes: a first hierarchical level including capability information.

10. The method of claim 1 if no networking capabilities may be employed by both the first network entity and peer network entity to perform the networking function, transmitting, to the peer network entity, a message indicating the no networking capabilities may be agreed upon.

11. An apparatus comprising:
    a means for transmitting, from the apparatus to a peer network entity, an offer to perform at least one networking function, wherein the offer includes a set of parameters indicating at least one version and at least one networking capability that may be employed by the apparatus to perform the networking function;
    a means for receiving, from the peer network entity, a set of parameters indicating at least one version and at least one networking capability that may be employed by the peer network entity to perform the networking function; and a processor configured to determine if at least one version and at least one networking capability may be employed by both the apparatus and peer network entity to perform the networking function; and the processor further configured to, if so, select at least one version and at least one networking capability to employ to perform the networking function, a means for transmitting the selected networking capability to the peer network entity, and perform the network function in partnership with the peer network entity by employing the selected networking capability; and wherein the set of parameters includes: a group of parameters for each capability, wherein the group of parameters includes: a capability identifier, an action type, capability description length, and a capability description.

12. The apparatus of claim 11 wherein the set of parameters includes: a nested set of parameters arranged in a hierarchal fashion including: a first hierarchal level including networking entity information, a second hierarchal level including functional information, and a third hierarchal level including capability information.

13. A method comprising:

establishing a first network entity on a wireless network comprising at least one peer network entity, wherein the wireless network utilizes a post-third generation (3G) wireless networking standard; and transmitting a message, from the first network entity to a peer network entity, wherein the message includes a set of parameters indicating at least one version and at least a portion of the networking capabilities of the first network entity; and wherein the set of parameters includes: a group of parameters for each capability, wherein the group of parameters includes: a capability identifier, an action type, capability description length, and a capability description.

14. The method of claim 13 wherein the wireless network includes a network substantially compliant with a WiMAX standard.

15. The method of claim 13 wherein transmitting includes:

transmitting, after the occurrence of either a capabilities change due to upgrade, a capabilities change due to failure, an expiration of a timer or a periodic trigger, an unsolicited message including a set of parameters indicating the networking capabilities of the first network entity.

16. The method of claim 13 further including: receiving, from a peer network entity, a request for information regarding the networking capabilities of the first network entity; and wherein transmitting includes: transmitting the message in response to the received request.

17. The method of claim 16 wherein receiving a request includes: receiving, from the peer network entity, a message indicating the networking capabilities of a peer entity.

18. The method of claim 13 wherein transmitting includes: integrating a set of parameters indicating the networking capabilities of the first network entity into a non-capabilities message; and transmitting the non-capabilities message.

\* \* \* \* \*